United States Patent [19]

Matsuzaki et al.

[11] Patent Number: 4,516,183
[45] Date of Patent: May 7, 1985

[54] OVERCURRENT RELAY

[75] Inventors: Tadashi Matsuzaki; Koji Sumi, both of Kobe, Japan

[73] Assignee: Mitsubishi Denki Kabushiki Kaishi, Tokyo, Japan

[21] Appl. No.: 440,603

[22] Filed: Nov. 10, 1982

[30] Foreign Application Priority Data

Dec. 2, 1981 [JP] Japan .................. 56-196156

[51] Int. Cl.³ .................................. H02H 7/26
[52] U.S. Cl. ........................ 361/71; 361/110; 361/94; 361/86
[58] Field of Search .............. 361/71, 74, 75, 94, 361/93, 110, 87, 86

[56] References Cited

U.S. PATENT DOCUMENTS 3,979,645 9/1976 Wittenzellner .............. 361/75 X
4,263,635 4/1981 Welk .......................... 361/71

FOREIGN PATENT DOCUMENTS 65951 12/1978 Japan ........................ 361/71

*Primary Examiner*—Patrick R. Salce
*Attorney, Agent, or Firm*—Lowe King Price & Becker

[57] ABSTRACT

An overcurrent relay comprises an input transformer (7), a rectifying circuit (8), a level detecting circuit (9) for providing an operation signal ($S_1$) when a direct current signal voltage (E) exceeds a predetermined value, a determining means (10 to 15) for determining a time period of at least the positive and negative components of an ac signal voltage ($V_1$) for providing a determination signal ($S_6$) when the determined time period exceeds a predetermined time period, and a blocking means (16 and 17) responsive to the determination signal ($S_6$) for blocking the operation signal ($S_1$) from being output. In the case where the alternating current input current (I) and the ac signal voltage ($V_1$) involve an attenuated direct current component due to magnetic saturation of a current transformer and the like, the reset time period of the operation signal ($S_1$) is prolonged, while that time period of the ac signal voltage ($V_1$) due to the attenuated direct current component becomes larger than a predetermined value, whereby a determination signal ($S_6$) is obtained. As a result, the blocking means (16 and 17) blocks the operation signal ($S_1$) from being output, whereby a reset operation is performed. Therefore, the reset time period of the output signal ($S_7$) is shortened.

12 Claims, 12 Drawing Figures

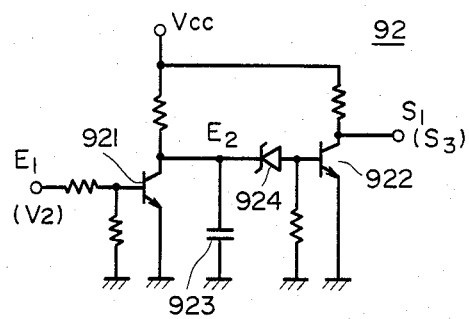
FIG. 4 PRIOR ART
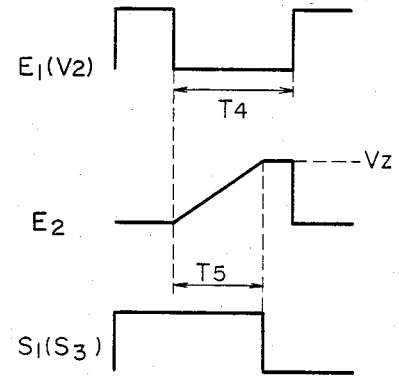
FIG. 5 PRIOR ART
FIG. 6 PRIOR ART
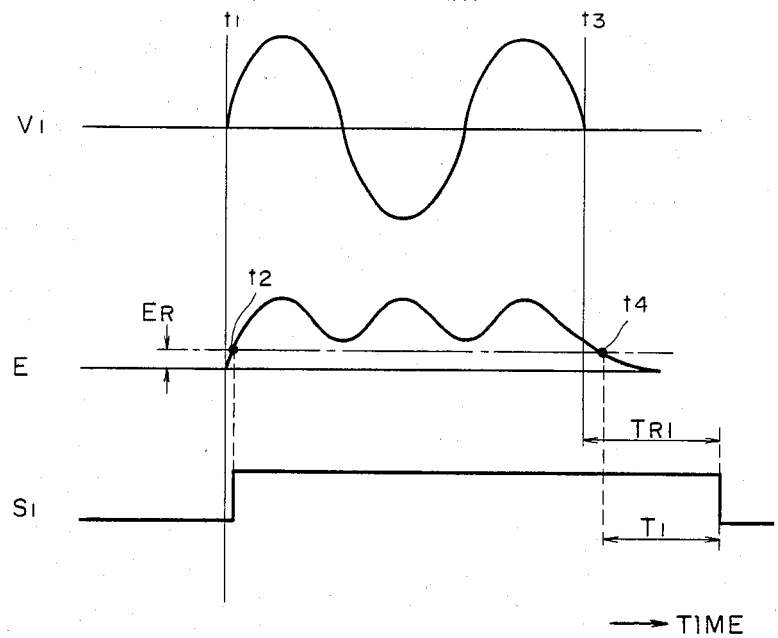
FIG. 7 PRIOR ART

OVERCURRENT RELAY

BACKGROUND OF THE INVENTION

1. Field of the Invention

The present invention relates to an overcurrent relay. More specifically, the present invention relates to an overcurrent relay in which a reset time is shortened.

2. Description of the Prior Art

An overcurrent relay is one kind of a protective relay and is used for protection of a power line, for example.

FIG. 1 is an outline view showing one example of a power line. A power line 2 is coupled through a circuit breaker 3 to a power source 1. A current transformer 4 is operatively coupled to the power line 2 on the side of the power source 1 with respect to the breaker 3. An overcurrent relay 5 is coupled to the current transformer 4 and a control circuit 6 is coupled to the output of the overcurrent relay 5. The output of the control circuit 6 is coupled to the circuit breaker 3. In the case where a failure occurs in the power line 2, for example, in the case where a failure occurs at a failure point $F_S$ or $F_L$, a large ac input current I flows from the current transformer 4 to the overcurrent relay 5. The overcurrent relay 5 is responsive thereto to provide an operation signal $S_1$ and the control circuit 6 is responsive to the operation signal $S_1$ to trip the circuit breaker 3. Thus, the power line 2 is protected.

FIG. 2 is a block diagram showing a conventional overcurrent relay. An input terminal IN of an input transformer 7 is coupled to the current transformer 4 shown in FIG. 1. The output of the input transformer 7 is coupled to an input of a rectifying circuit 8 and the output of the rectifying circuit 8 is coupled to the input of a level detecting circuit 9. The output of the level detecting circuit 9 is coupled to an output terminal OUT and the output terminal OUT is coupled to the input of the control circuit 6 shown in FIG. 1. The input transformer 7 serves to convert the ac input current I from the current transformer 4 into an ac signal voltage $V_1$. The rectifying circuit 8 rectifies the ac signal voltage $V_1$ to provide a dc signal voltage E. The level detecting circuit 9 provides an operation signal $S_1$ when the dc signal voltage E exceeds a predetermined value.

FIG. 3 is a schematic diagram of one example of the rectifying circuit 8. The FIG. 3 embodiment comprises a full-wave rectifying and smoothing circuit employing a well-known operational amplifier. An operation thereof will be briefly described. The ac signal voltage $V_1$ is half-wave rectified by a circuit mainly comprising an operational amplifier 81, and a half-wave rectified voltage of the ac signal voltage $V_1$ of inverted polarity is obtained at the junction 83. An operation is made of the ac signal voltage $V_1$ and the above described half-wave rectified voltage and a smoothing operation is also performed by means of a circuit mainly comprising an operational amplifier 82, whereby a full-wave rectified direct current signal voltage E is provided.

FIG. 4 is a block diagram showing one example of the level detecting circuit 9. A stretching timer circuit 92 is coupled to a voltage comparator 91. The plus input terminal of the voltage comparator 91 is connected to receive the dc signal voltage E and the minus input terminal of the voltage comparator 91 is connected to receive a predetermined set voltage $E_R$. The voltage comparator 91 serves to compare the dc signal voltage E and the predetermined set voltage $E_R$, thereby to provide the dc signal voltage $E_1$ when $E > E_R$. The stretching timer circuit 92 serves to stretch the dc signal voltage $E_1$ by a predetermined time period $T_1$, thereby to provide the operation signal $S_1$. The purpose of providing the stretching timer circuit 92 will be described. In the case where the set voltage $E_R$ is slightly larger than the dc signal voltage E, the direct current signal voltage $E_1$ is obtained in a form which is interrupted and conducted for each half cycle of the ac input current I. Therefore, the stretching timer circuit 92 is provided to make continuous the intermittent dc signal voltage $E_1$ to provide a continuous operation signal $S_1$. Accordingly, a predetermined time period $T_1$ for stretching is selected to be approximately a half-cycle of the line source voltage, i.e. approximately 10 msec in the case when the frequency of the line source is of 50 Hz, for example.

FIG. 5 is a schematic diagram showing one example of the stretching timer circuit 92. An integrating capacitor 923 is coupled to the output of a switching transistor 921. The capacitor 923 is coupled through a Zener diode 924 to a switching transistor 922. Operation of the circuit will now be briefly described with reference to FIG. 6. FIG. 6 is a graph showing waveforms of the signals at various portions of the FIG. 5 diagram. Assuming that the waveform of the dc signal voltage $E_1$ is as shown in the figure, when the dc signal voltage $E_1$ attains the low level, the transistor 921 is turned off and the voltage $E_2$ of the capacitor 923 starts increasing. When the voltage $E_2$ reaches the Zener voltage $V_Z$ of the Zener diode 924, the transistor 922 is turned on, so that the operation signal $S_1$, which has thus far assumed the high level, assumes the low level. Accordingly, it follows that the operation signal $S_1$ is stretched by the time period $T_5$ as compared with the dc signal voltage $E_1$. Since the value of the time period $T_5$ can be arbitrarily changed as a function of the capacitance of the capacitor 923, the same is selected to be equal to the above described time period $T_1$.

Operation of the conventional overcurrent relay shown in FIG. 2 will now be described with reference to FIGS. 7 and 8. FIG. 7 is a graph showing waveforms of the signals at various portions in the FIG. 2 overcurrent relay in the case where a failure occurs in the power line 2. FIG. 8 is a graph showing waveforms of the signals at various portions in the FIG. 2 overcurrent relay in the case where a failure occurs at the point very close to the point where the overcurrent relay is provided in the power line 2.

Now mainly referring to FIG. 7, assuming that a failure occurred at a time $t_1$ at the failure point $F_L$ of the power line 2, a large amount of the ac input current I flows from the current transformer 4 into the input transformer 7 and the ac signal voltage $V_1$ is obtained from the input transformer 7, where an ordinary load current before occurrence of the failure is neglected for simplicity of description. The dc signal voltage E is obtained from the rectifying circuit 8 and, at the time point $t_2$ when the dc signal voltage E exceeds the set voltage $E_R$, the operation signal $S_1$ is obtained from the level detecting circuit 9. The control circuit 6 is responsive to the operation signal $S_1$ to trip the circuit breaker 3, whereby the circuit breaker 3 is tripped at the time $t_3$. As a result, the ac signal voltage $V_1$ becomes zero at the time $t_3$; however, the ac signal voltage E gradually attenuates by virtue of the capacitor included in the rectifying circuit 8 and becomes smaller than the set voltage $E_R$ at the time $t_4$. However, the operation signal $S_1$ assumes the low level at a point in time delayed by the time period $T_1$ with respect to the time $t_4$, the delay provided by means of the stretching timer circuit 92 included in the level detecting circuit 9, whereby the relay is reset. Accordingly, the reset time period of the relay in such case is $T_{R1}$.

Now mainly referring to FIG. 8, assuming a case where a failure occurs at the time $t_1$ at the failure point $F_s$ very close to the point where the relay is installed in the power line 2, a failure current flowing to the power line 2 becomes extremely large. In such case, if an overcurrent factor of the current transformer 4 is small, the ac input current I becomes a much distorted waveform due to magnetic saturation of the core of the current transformer 4, whereby the ac signal voltage $V_1$ also becomes an extremely distorted waveform. Now by an overcurrent factor of the current transformer 4 is meant a ratio of the maximum current in which the primary current and the secondary current are kept in a linear relation to the rated current, which is usually denoted by (n). In such case a, even if the circuit breaker 3 is tripped at the time $t_3$ and a failure current flowing through the power line 2 becomes zero, the secondary current of the current transformer 4, i.e. the alternating current input current I, does not immediately become zero and assumes a form of an attenuating dc component, which gradually becomes zero. Accordingly, an attenuating dc component $V_1'$ is involved in the ac signal voltage $V_1$ and the attenuating dc component $E'$ is involved in the dc signal voltage E. As a result, the dc signal voltage E becomes smaller than the the set voltage $E_R$ at the time $t_5$ which is much later than the time $t_3$, whereby the reset time period of the relay becomes $T_{R2}$, which is extremely longer than the above described reset time period $T_{R1}$. This is not convenient to an overcurrent relay. This will be described in detail in the following.

Usually a main protective relay and a back-up relay are employed in a protective relaying system of a power line. A main protective relay usually comprises a relay capable of high speed operation, while the back-up relay is implemented by a relay capable of an assured operation, such as an overcurrent relay. In the case where a failure occurs in a power line, both relays operate, although the circuit breaker is tripped by the main protective relay. Both relays are reset due to the tripping of the circuit breaker. However, if and when the reset time period of the overcurrent relay is too long, the circuit breaker is deemed as not having been tripped due to some trouble of the circuit breaker in the control circuit in spite of the fact that the circuit breaker has been tripped, whereby there is a concern for the possibility that another operation is performed in which the circuit breaker is forcedly tripped by means of a separate route or a further operation is performed in which the other circuit breaker of the same power line is forcedly tripped. In particular, when the other circuit breaker is forcedly tripped, the section where a failure has not occurred is brought in the state of power failure, with the result of a considerable amount of damage. Therefore, it has been desired to provide an overcurrent relay in which a reset time period is not prolonged, even if an attenuated dc component is included in the ac input current of the relay, as in a case where a failure occurs in a close vicinity of the point where a relay is installed.

SUMMARY OF THE INVENTION

Briefly described, the present invention comprises an overcurrent relay, which comprises converting means for converting an ac input current into an ac signal voltage, rectifying means for rectifying the ac signal voltage for providing a dc signal voltage, level detecting means for providing an operation signal when the dc signal voltage exceeds a predetermined value, determining means for determining a time period of at least the positive and negative components of the ac signal voltage for providing a determination signal when the determined time period exceeds a predetermined time period, and a blocking means responsive to the determination signal for blocking the operation signal from being output.

According to the present invention, in the case where a failure occurs in the vicinity of the point where an overcurrent relay is installed in a power line to cause a large magnitude failure current, whereby a current transformer gives rise to magnetic saturation and an attenuating dc component is included in an ac input current and an ac signal voltage, the reset time period of the operation signal obtained from the level detecting means is prolonged. On the other hand, the time period of at least one of the positive and negative components of the ac signal voltage is determined by the determining means, wherein the determined time period becomes larger than a predetermined time period due to the attenuating dc component and then the determination signal is obtained. The blocking means is responsive to the determination signal to block the operation signal from being output, whereby the reset operation is performed. Accordingly, it was confirmed that the reset time period of the output signal obtained from the overcurrent relay is drastically shortened.

Accordingly, a principal object of the present invention is to provide an overcurrent relay, wherein a reset time period is not prolonged even in the case where an attenuating dc component is included in an ac input current.

A principal advantage of the present invention is that even in the case where a failure occurs at a point very close to a place where an overcurrent relay is installed in a power line, whereby a large amount of a failure current flows and a current transformer gives rise to magnetic saturation, so that an attenuating dc is included in an ac input current, a reset time period is not prolonged and rather the same is drastically shortened.

Another advantage of the present invention is that since the reset time period is shortened, malfunction of a protective relay system due to a prolonged reset time period can be avoided in the case where an overcurrent relay is employed as a back-up relay.

A further advantage of the present invention is that since a reset time period is not prolonged even if an attenuating dc is included in an ac input current, it becomes unnecessary to undesirably increase an overcurrent factor of a current transformer.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram of one example of a level detecting circuit;

FIG. 5 is a schematic diagram of one example of a stretching timer circuit;

FIG. 6 is a graph showing waveforms of the signals at the various portions in the FIG. 5 diagram;

FIG. 7 is a graph showing waveforms of the signals at various portions of the FIG. 2 overcurrent relay in the case where a failure occurs in the power line;

DETAILED DESCRIPTION OF THE PREFERRED EMBODIMENTS

Figure 1:
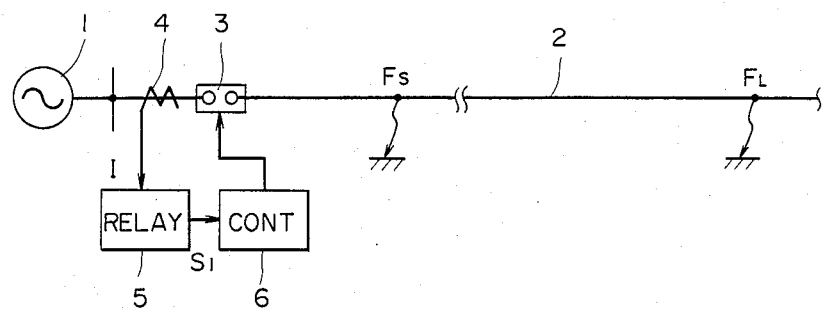
FIG. 1 is an outline view showing one example of a power line.
Figure 2:
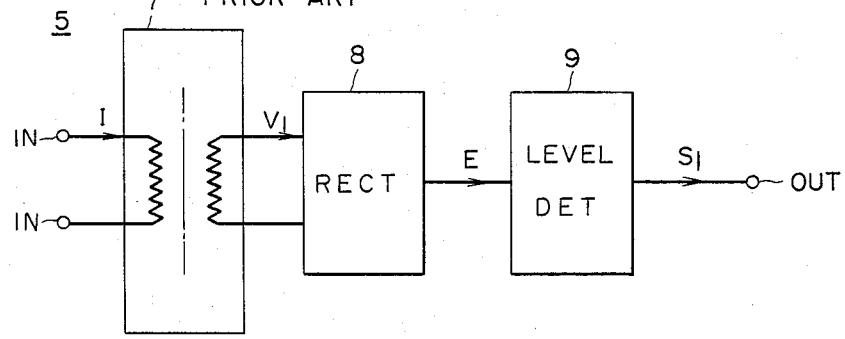
FIG. 2 is a block diagram of a conventional overcurrent relay.
Figure 3:
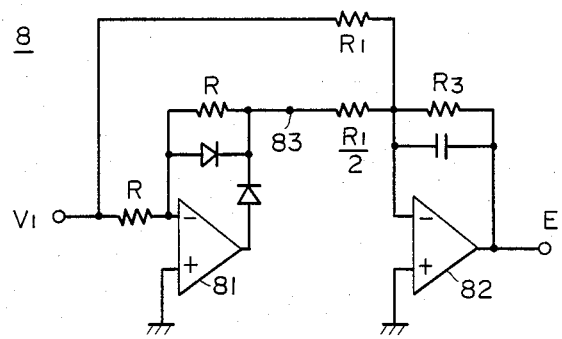
FIG. 3 is a schematic diagram showing one example of a rectifying circuit.
Figure 9:
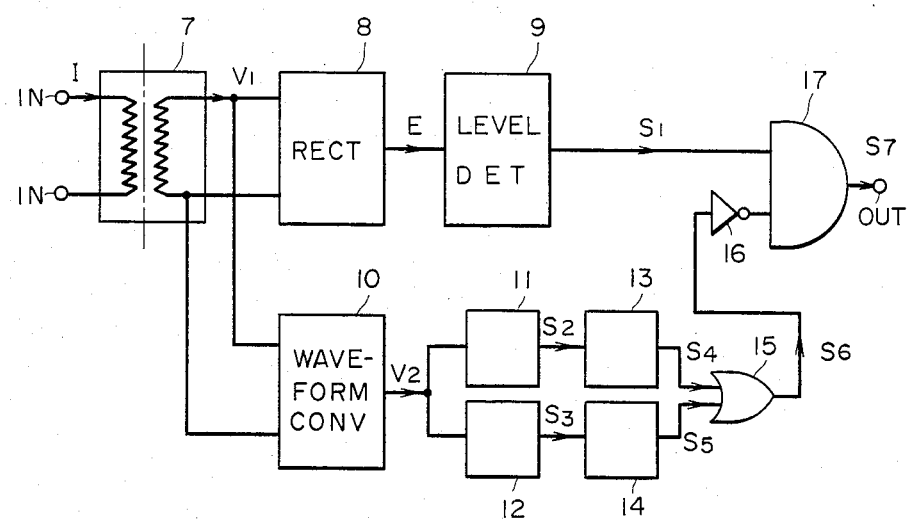
FIG. 9 is a block diagram of one embodiment of the present invention.

FIG. 9 is a block diagram of one embodiment of the present invention. Now a major difference of the FIG. 9 embodiment from the FIG. 2 conventional overcurrent relay will be described in the following. The FIG. 9 embodiment additionally comprises determining means for determining a time period of at least positive and negative components of the ac signal voltage $V_1$ for providing a determination signal when the time period exceeds a predetermined time period, and blocking means responsive to the determination signal for blocking the operation signal $S_1$ from being output. More specifically, the input of a rectangular waveform converting circuit 10 is coupled to the output of the input transformer 7 and the inputs of time period determining circuits 11 and 12 are coupled to the output of the rectangular waveform converting circuit 10. The outputs of the time period determining circuits 11 and 12 are coupled to the inputs of the stretching timer circuits 13 and 14. The outputs of the stretching timer circuits 13 and 14 are coupled to the input of an OR gate 15 and the output of the OR gate 15 is coupled to the input of an inverter 16. The output of the inverter 16 is coupled to one input of an AND gate 17 and the other input of the AND gate 17 is connected to receive the output of the level detecting circuit 9. The output of the AND gate is connected to the output terminal OUT. The rectangular waveform converting circuit 10 serves to convert the ac signal voltage $V_1$ obtained from the input transformer 7 to a rectangular waveform signal $V_2$. The time period determining circuit 11 serves to determine a time period of the positive component of the rectangular waveform signal $V_2$, thereby to provide the signal $S_2$ when the determined time period exceeds a predetermined time period $T_2$. The time period $T_2$ is selected to be a half-cycle of the fundamental frequency component of the ac input current I, and is 10 msec in the case where the frequency of the line source is 50 Hz. The time period determining circuit 12 serves to determine the time period of the negative component of the rectangular waveform signal $V_2$, thereby to provide a signal $S_3$ when the determined time period exceeds 10 msec, as in the case of the time period determining circuit 11. The stretching timer circuit 13 serves to stretch the signal $S_2$ by a predetermined time period $T_3$, say approximately 20 msec, thereby to provide a signal $S_4$. The stretching timer circuit 14 similarly serves to stretch the signal $S_3$ by approximately 20 msec, thereby to provide a signal $S_5$. The logical sum of the signals $S_4$ and $S_5$ is evaluated, thereby to provide a signal $S_6$. The inverter 16 evaluates an inversion of the signal $S_6$, thereby to provide an inverse logic signal of the signal $S_6$. The AND gate 17 evaluates the logical product of the above described signal $S_1$ and the signal obtained from the inverter 16, thereby to provide a signal $S_7$ to the output terminal OUT.

Figure 10:
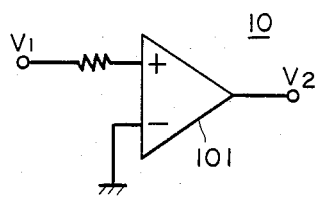
FIG. 10 is a block diagram of one example of a rectangular waveform converting circuit.
Figure 11:
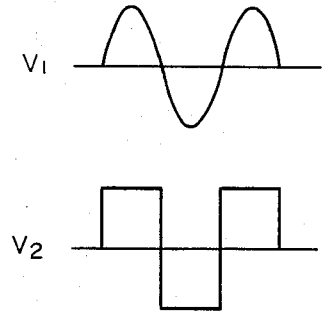
FIG. 11 is a graph showing waveforms of the input and output of the FIG. 10 diagram.

FIG. 10 is a view showing one example of the rectangular waveform converting circuit 10. In the embodiment shown the rectangular waveform converting circuit 10 comprises an operational amplifier 101. FIG. 11 is a graph showing signal waveforms of the input and output of the FIG. 10 circuit. When the ac signal voltage $V_1$ is applied to the operational amplifier 101, the signal $V_2$ is obtained therefrom.

One example of the time period determining circuits 11 and 12 may be the same as that shown in FIG. 5. Now referring to FIG. 6, a description will be made of the time period by the use of these circuits. Meanwhile, it is assumed that the polarity of the input and output signals is properly inverted by means of a inverter, not shown. In considering the rectangular waveform signal $V_2$ applied to the time period determining circuit 12, the time period of the low level of the rectangular waveform signal $V_2$ is assumed to be $T_4$ and a predetermined time period is assumed to be $T_5$. If and when $T_4 < T_5$, the voltage $E_2$ does not reach the Zener voltage $V_Z$ and therefore the transistor 922 is not turned on and the signal $S_3$ does not assume the low level. Accordingly, by selecting the time period $T_5$ to be equal to the above described time period $T_2$, the time period of the negative component of the rectangular waveform signal $V_2$ is determined. Likewise, the time period of the positive component of the rectangular waveform signal $V_2$ is determined by means of the time period determining circuit 11.

One example of the stretching timer circuits 13 and 14 may be similar to that shown in FIG. 5. In such a case, the time period $T_5$ shown in FIG. 6 may be selected to be equal to the above described time period $T_3$.

Now the operation of the FIG. 9 embodiment will be described with reference to FIG. 12.

Figure 8:
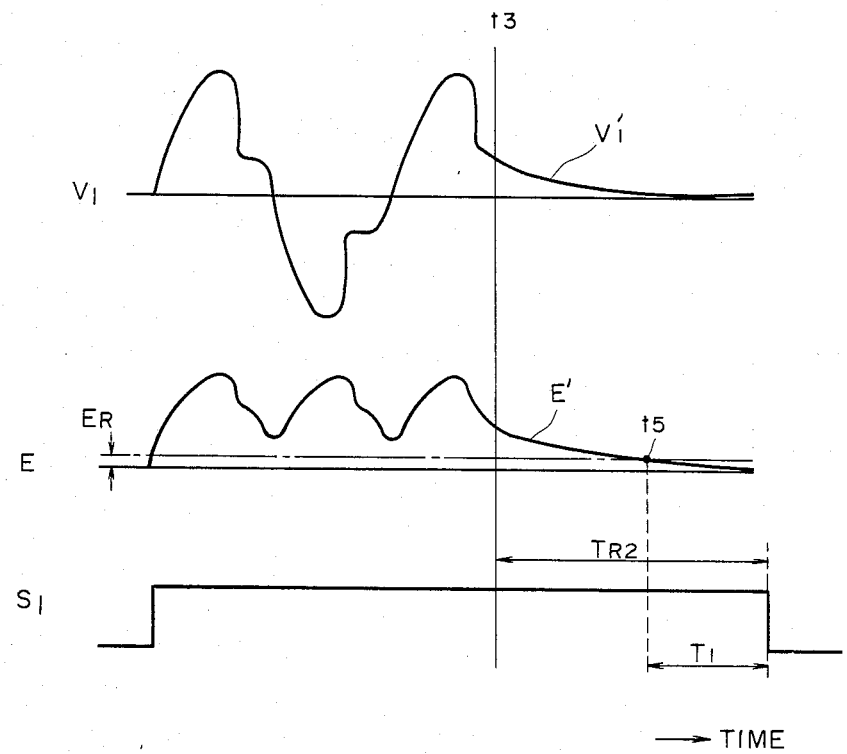
FIG. 8 is a graph showing waveforms of the electrical signals at the various portions in the FIG. 2 overcurrent relay in the case where a failure occurs at the point very close to the point where the overcurrent relay is installed in the power line.
Figure 12:
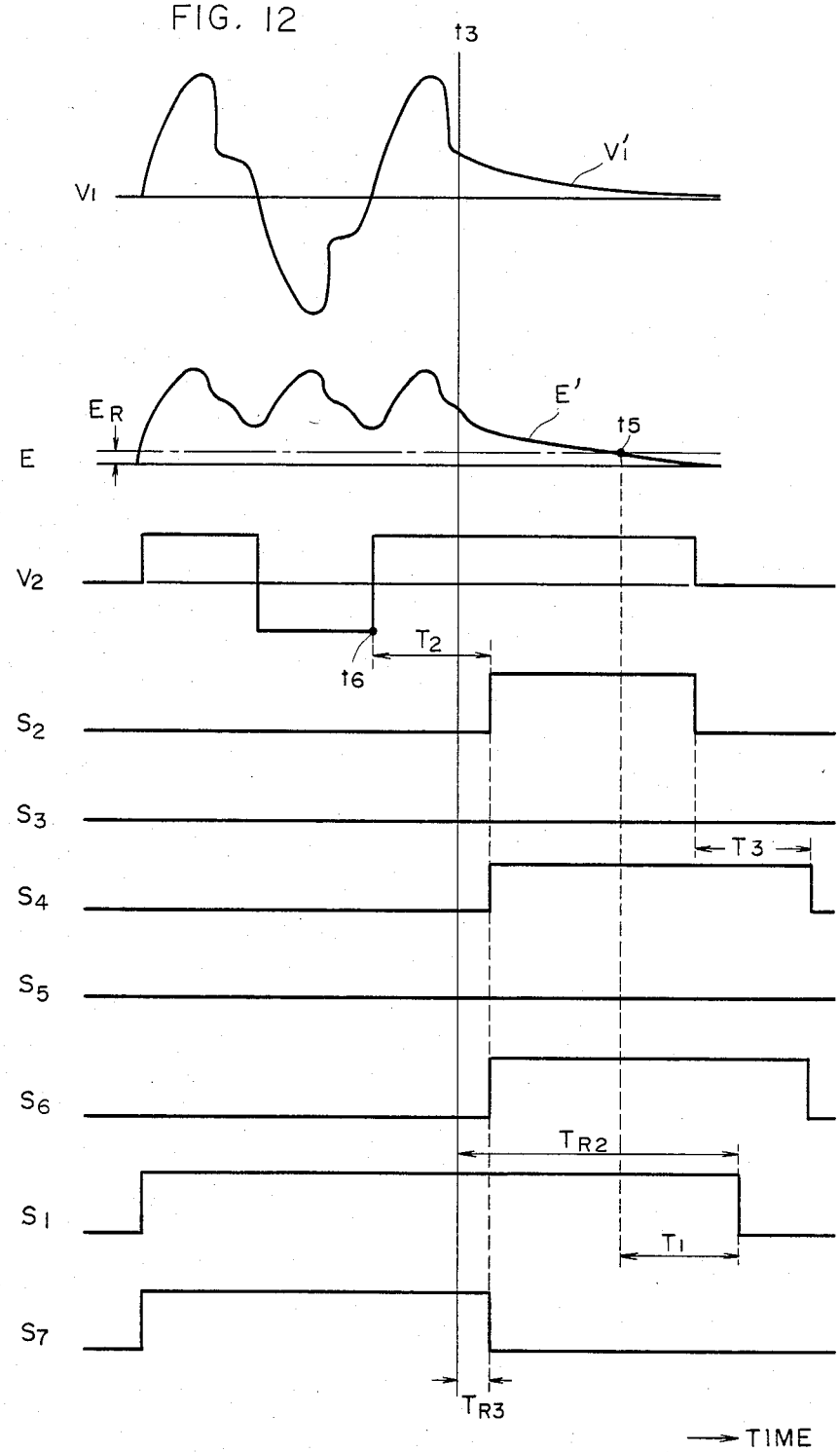
FIG. 12 is a graph showing waveforms of the electrical signals at the various portions in the FIG. 9 embodiment in the case where a failure occurs at a point very close to the point where the overcurrent relay is installed in the power line.

FIG. 12 is a graph showing waveforms of the signals at various portions in the FIG. 9 embodiment in the case where a failure has occurred at the point close to the point where the overcurrent relay is installed on the power line 2. In the case where a failure has occurred at the failure point $F_S$ close to a point where the relay is installed on the power line 2, the ac signal voltage $V_1$, the direct current signal voltage E and the operation signal $S_1$ are the same as those shown in FIG. 8 and therefore a repeated description will be avoided. The time period of the positive component after the time point $t_6$ of the rectangular waveform signal $V_2$ is prolonged by the above described time period $T_2$ due to the attenuating direct component $V_1'$ included in the ac signal voltage $V_1$ and the same is determined by the time period determining circuit 11, whereby the signal $S_2$ is obtained therefrom. The signal $S_2$ is stretched by the time period $T_3$ by means of the stretching timer circuit 13 and the signal $S_4$ is obtained therefrom. On the other hand, in such case the time period of the negative component of the rectangular waveform signal $V_2$ is smaller than the time period $T_2$ and therefore the signals $S_3$ and $S_5$ are not obtained from the time period determining circuit 12 and the stretching timer circuit 14. The signal $S_6$ is obtained from the OR gate 15 and the same is inverted by the inverter 16 and the inverted output is applied to the AND gate 17. Therefore, during a time period when the signal $S_6$ is obtained, the operation signal $S_1$ is blocked by means of the AND gate 17 and the signal $S_7$ is not obtained from the AND gate 17. In such case, since the signal $S_2$ has been stretched by the period $T_3$ to be the signal $S_4$, the signal $S_6$ does not become the low level before the signal $S_1$ becomes the low level. Accordingly, the reset time period of the embodiment becomes $T_{R3}$ and the same is much shorter than the reset time period $T_{R2}$ of the conventional relay. Meanwhile, in the case of an ordinary failure wherein the attenuating component $V_1'$ is not included in the ac signal voltage $V_1$, the time period of the positive or negative component of the ac signal voltage $V_1$ remains a half-cycle of the fundamental frequency component of the ac input current I and the signals $S_2$ and $S_3$ are not obtained from the time period stretching circuits 11 and 12. Therefore, the operation of the embodiment is substantially the same as that of the conventional relay shown in FIG. 2. In such case, since the reset time period $T_{R1}$ does not become considerably long, the reset time period is not of concern.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An overcurrent relay, comprising:
   converting means for converting an AC input current into an AC signal voltage having positive and negative components,
   rectifying means coupled to said converting means for rectifying said AC signal voltage into a DC signal voltage,
   level detecting means coupled to said rectifying means for outputting an operation signal when said DC signal voltage exceeds a predetermined value,
   determining means coupled to said converting means for determining the time period of at least one of the positive and negative components of said AC signal voltage for providing a determination signal when said determined time period exceeds a first predetermined time period,
   blocking means coupled to said level detecting means and said determining means and responsive to said determination signal for blocking said operation signal from being output.

2. An overcurrent relay in accordance with claim 1, wherein said determining means comprises
   rectangular waveform converting means coupled to said converting means for converting said AC signal voltage to a rectangular waveform signal, and
   time period determining means coupled to said rectangular waveform converting means for determining the time period of at least one of the positive and negative components of said rectangular waveform for providing said determination signal when said determined time period exceeds said first predetermined time period.

3. An overcurrent relay in accordance with claim 2, wherein said time period determining means comprises
   a time period determining circuit coupled to said rectangular waveform converting means for determining the time period of at least one of said positive and negative components of said rectangular waveform signal for providing a time period determined signal when said time period exceeds said first predetermined time period, and
   a stretching timer circuit coupled to said time period determining circuit for stretching said time period determining means by a second predetermined time period.

4. An overcurrent relay in accordance with claim 3, wherein said time period determining circuit comprises
   a first time period determining circuit coupled to said rectangular waveform converting means for determining the time period for the positive component of said rectangular waveform signal for providing a first time period determined signal when said determined time period exceeds said first predetermined time period, and
   a second time period determining circuit coupled to said rectangular waveform converting means for determining a time period of the negative component of said rectangular waveform signal for providing a second time period determined signal when said determined time period exceeds said first predetermined time period, and
   said stretching timer circuit comprises
   a first stretching timer circuit coupled to said first time period determining circuit for stretching said first time period determined signal by said second predetermined time period for providing a first stretched signal,
   a second stretching timer circuit coupled to said second time period determining circuit for stretching said second time period determined signal by said second predetermined time period for providing said second stretched signal, and
   a logical sum circuit coupled to said first and second stretching timer circuit for stretching said first and second stretched signal for evaluating the logical sum thereof for providing said determination signal.

5. An overcurrent relay in accordance with claim 4, wherein
   said first and second time period determining circuits and said first and second stretching time circuits each comprises an integrating circuit.

6. An overcurrent relay in accordance with claim 1, wherein said blocking means comprises
   an inverting means coupled to said determining means for inverting said determination signal and for providing an inversion signal, and
   a logical product circuit coupled to said level detecting means and said inverting means for providing a logical product of said operation signal and said inversion signal.

7. An overcurrent relay in accordance with claim 1, wherein said first predetermined time period is a half period of the fundamental frequency component of said alternating current input current.

8. An overcurrent relay in accordance with claim 1, wherein
said converting means comprises an input transformer.

9. An overcurrent relay in accordance with claim 1, wherein
said rectifying means comprises a full-wave rectifying/smoothing circuit.

10. An overcurrent relay in accordance with claim 1, wherein said level detecting means comprises a voltage comparator for comparing said dc signal voltage and a reference voltage and providing an output, and a stretching timer circuit for stretching the output from said voltage comparator by a further predetermined time period for providing said operation signal.

11. An overcurrent relay in accordance with claim 9, wherein
said full-wave rectifying/smoothing circuit comprises an operational amplifier.

12. An overcurrent relay in accordance with claim 10, wherein said stretching timer circuit comprises an integrating circuit.

* * * * *